E. L. ADAMS.
AUTOMATIC GRAIN WEIGHER.
APPLICATION FILED OCT. 14, 1911.

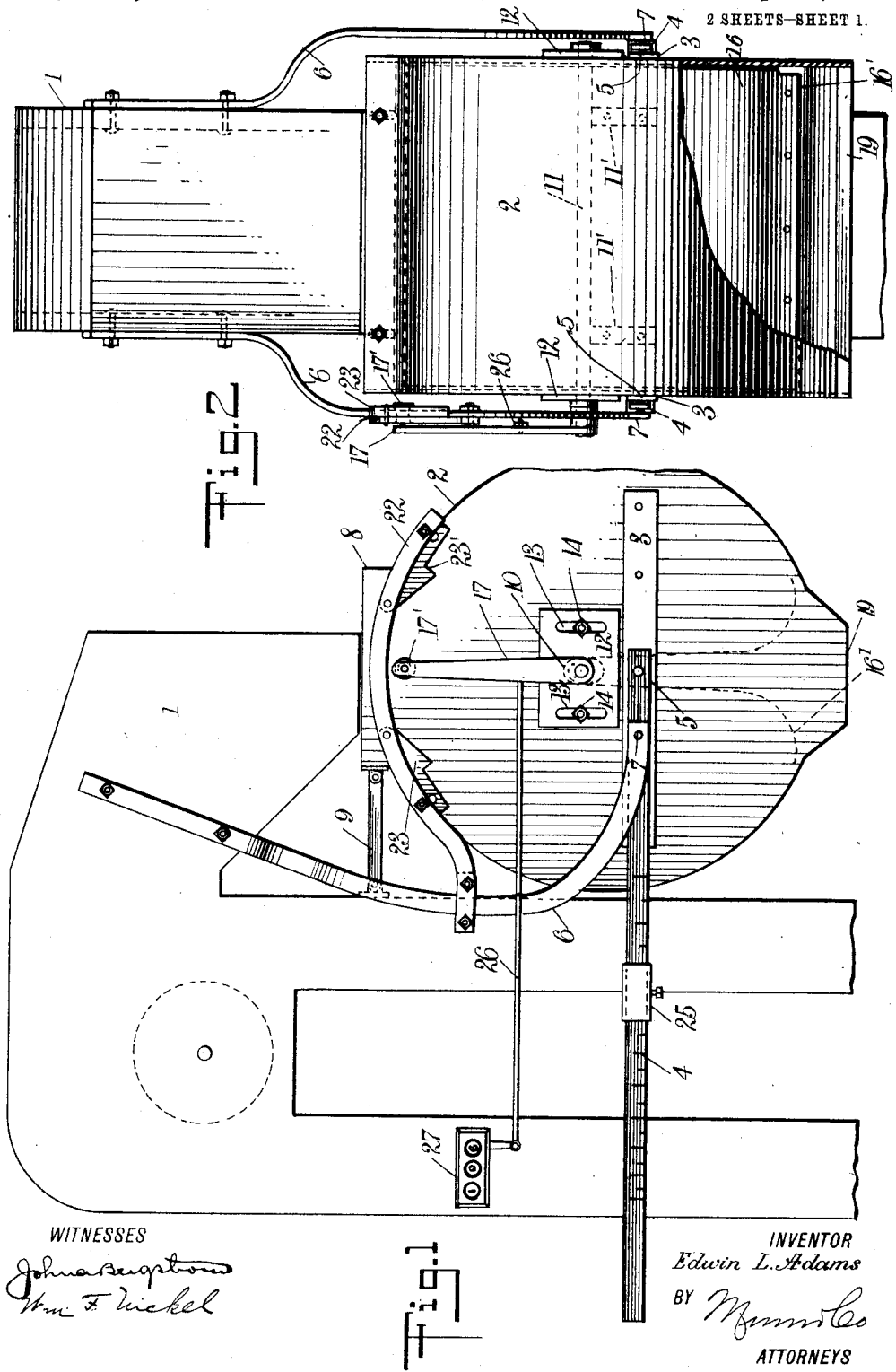

1,039,471.

Patented Sept. 24, 1912.

2 SHEETS—SHEET 2.

WITNESSES
John a Bergstrom
Wm. F. Nickel

INVENTOR
Edwin L. Adams
BY
Munn & Co
ATTORNEYS

UNITED STATES PATENT OFFICE.

EDWIN LENARD ADAMS, OF EDGAR, NEBRASKA, ASSIGNOR OF ONE-HALF TO NICHOLAS A. LINSTROM AND FRANK A. WESTERING, BOTH OF EDGAR, NEBRASKA.

AUTOMATIC GRAIN-WEIGHER.

1,039,471. Specification of Letters Patent. Patented Sept. 24, 1912.

Application filed October 14, 1911. Serial No. 654,573.

*To all whom it may concern:*

Be it known that I, EDWIN L. ADAMS, a citizen of the United States, and a resident of Edgar, in the county of Clay and State of Nebraska, have invented a new and Improved Automatic Grain-Weigher, of which the following is a full, clear, and exact description.

My invention relates to a device for the weighing of grain of all kinds, which is so constructed as to be operated automatically by the weight of the grain it receives. It comprises a hollow vessel of known capacity having an inlet at one end and an outlet at the other, and comprising means which control the outlet without closing the inlet, so that the grain can enter the vessel until the limit of its capacity is reached. This vessel is so mounted that as soon as a quantity of grain of a certain weight is received inside of the same, the outlet is automatically opened to permit the grain to be discharged. The means for controlling the outlet does not, however, at the same time close the inlet, so that, while the grain is being discharged from the receiving vessel, the flow of grain thereto is not interrupted. The grain thus passes continuously into the receiving vessel at one end and is delivered at the other end, being retained only long enough to actuate the mechanism which controls the outlet or discharge opening, and to register the number of times the outlet mechanism is actuated in this way, so as to indicate the measure of the total quantity of grain passing through the weigher.

Reference is to be had to the accompanying drawings forming a part of this specification, in which the same characters of reference indicate the same parts in all the views.

Figure 3:
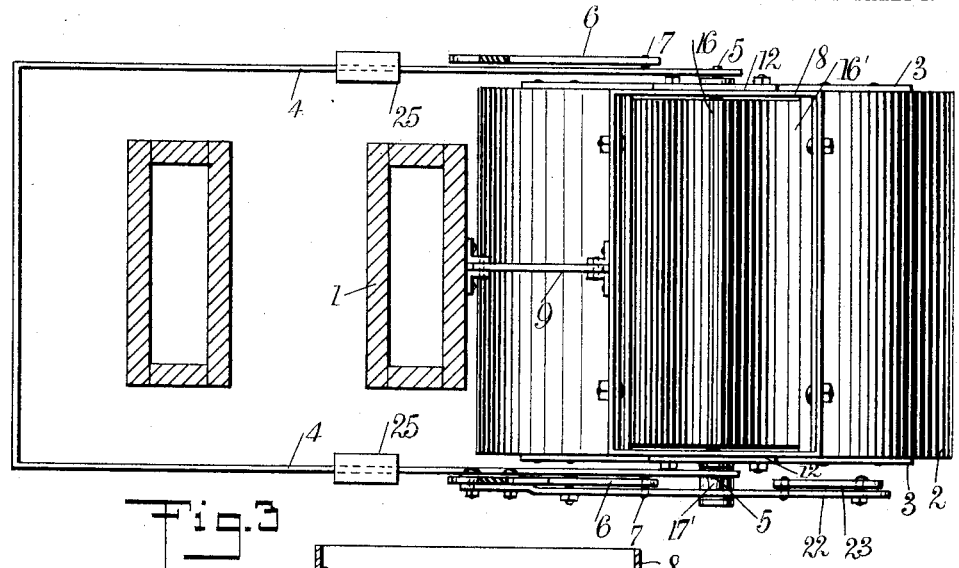
Figure 4:
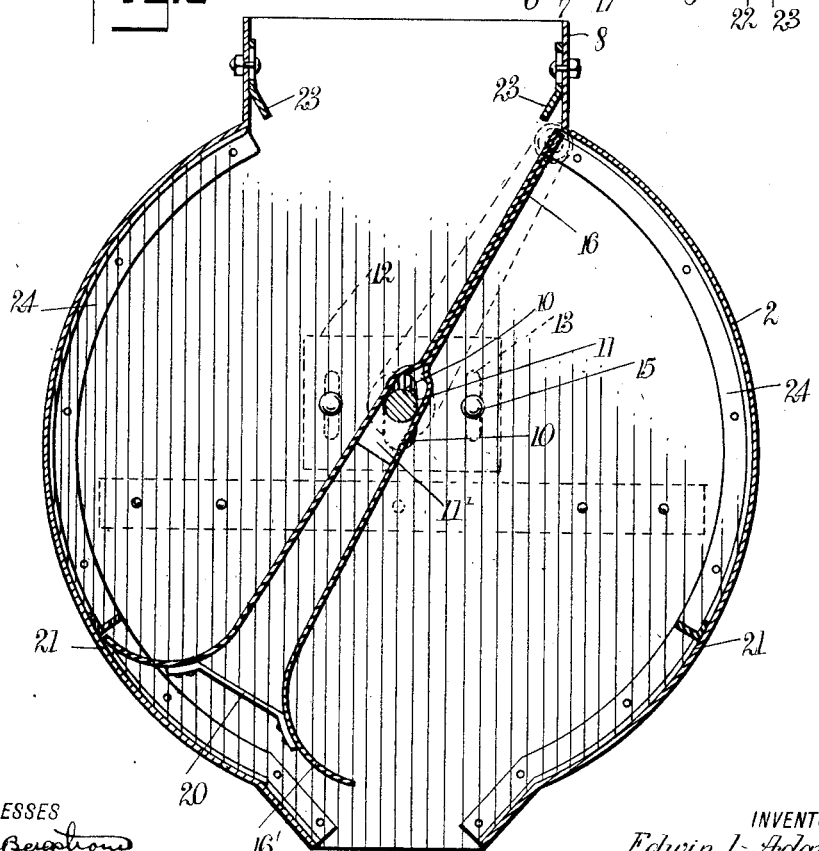

Figure 1 is a side view of my improved weighing device; Fig. 2 is a front elevation thereof; Fig. 3 is a top plan view of the same; and Fig. 4 is a vertical longitudinal sectional view through the receiving vessel of the device.

On the drawings, the numeral 1 indicates a chute or conveyer, through which grain is passed from an elevator or bin. This chute may be of any size or shape, and it is arranged to deliver into the receiving vessel of my weighing device, indicated by the numeral 2. This receiving vessel 2 is preferably approximately cylindrical in shape, having flat ends arranged in vertical positions and connected by curved sides. Across the flat ends, below the center of the same, are fastened bars 3, to which are pivotally connected the ends of a yoke-shaped weighing lever 4, the point of pivotal connection being effected by the pins 5. The arms of this yoke-shaped weighing lever 4 are pivotally connected to supporting arms 6, by means of pins 7, these supporting strips 6 being secured to any fixed point, such as the sides of the conveyer or chute 1. The pins 5 are arranged in the ends of the arms of the lever 4, and the pins 7 at points spaced a short distance from said ends, so that the receiving vessel or casing 2, and the lever 4, can move a certain distance around the pins 7 as an axis.

The casing 2 has an inlet 8, which is pivotally connected by a link 9 to any fixed point, such as the conveyer 1. This link 9 prevents the casing 2 from rotating around the pins 5, but does not interfere with a certain amount of vertical movement thereof, which movement is necessary in order to weigh and register the quantity of grain received by the casing 2.

The flat vertical ends of the casing 2 are provided with vertical elongated openings 10, through which passes a spindle 11. This spindle is mounted to turn in round openings through plates 12, which are adjustably mounted upon the outer surfaces of the ends to permit the spindle to be moved up and down, as conditions require. These plates 12 have slots 13, through which are passed bolts mounted in circular openings in the ends. These bolts have nuts 14 on their outer ends, and heads 15 on their inner ends; and when the nuts 14 are tightened, the plate will be held in any adjusted position. On loosening these nuts the plates 12 can be moved up and down, and the spindle 11 with them.

The spindle 11 has a pair of laterally-depending projections 11', and on this spindle and secured thereto by bolts passing through the projections 11', is mounted a valve or damper 16. This valve 16 swings on the spindle 11 as an axis, this spindle 11 moving freely in the circular openings through the plates 12; and connected to one of the outer ends of the spindle 11 is an arm 17, which extends in an upward direction and has a roller 17' mounted in its extremity. The spindle 11 may be made in two parts to permit of its ready assembling in the casing 2; or it may be made in one part, with the projections 11' removably secured to it, to permit the spindle and the valve to be secured to each other inside of the casing when the weighing device is put together.

The valve 16 is preferably made of a pair of plates arranged in contact with each other above the spindle 11, but diverging below the same, the lower ends of the diverging portions being curved outward, as shown at 16'. The parallel edges of the curved extremities of these two plates are spaced a sufficient distance apart to close up the discharge opening 19 in the bottom of the casing, and are held in rigid relation to each other by means of a connecting plate 20. The valve, of course, can swing to a certain extent on the spindle 11 as an axis, and it is limited in its movement by stops 21 secured to the inner surfaces of the curved sides of the casing 2, at the proper distance from the edges of the discharge opening 19. The position of these stops 21 is so chosen that the upper end of the valve in its swinging movement passes no farther than from side to side of the inlet opening 8.

To the front bar 6 is secured an arc-shaped arm 22, having a pair of plates 23 secured to it in such positions that these plates will lie adjacent the opposite sides of the inlet opening 8, as shown in Fig. 1. These plates have notches 23' on their lower edges, the function of these notches being to engage the roller 17' and hold the arm and the valve 16 in inclined position.

24 are angle-pieces which secure the curved sides of the casing 2 to the flat ends; and 25 is a suitable weight mounted to slide upon the lever 4.

In order to register the number of times that the valve 16 is operated, and thus indicate the total quantity of grain that passes through the weighing device, I connect a link 26 to the arm 17 at one end and to an indicator 27 at the other. This indicator may be of almost any type; and whenever the arm 17 moves to the right or left, the movement will be registered by the mechanism on the indicator shown. In operation, the empty casing is depressed against the action of the weight 25, and the arm 17 pushed over far enough to bring one of the edges 16' against one of the stops 21. The casing is now released, and the weight 25 will lift the same so as to bring the roller 17' into engagement with the notch 23' in one of the plates 22. The grain is then allowed to flow through the chute 1 into the casing 2, and the bent plates 23 on the inside of the inlet opening adjacent the upper edge of the valve will prevent any of the grain leaking past the top edge of the valve and out through the bottom. In the position shown in Fig. 4, for example, the half of the interior of the casing to the left of the valve 16 will be filled, and the other half remain empty. As soon as the full half of the casing between the valve 16 and the inlet opening 8 is filled, the weight 25 will be overcome, and the casing will sink, the lever arm 4 rotating around the pins 7 as an axis. This will move the roller 17' out of engagement with the notch 23', and the weight of the grain pressing against the valve will begin to move the valve over to the other side of the inlet 8 in a counter-clockwise direction. In order to obtain this effect it will be understood that the valve is mounted on the spindle 11 so that the distance from this spindle to the top edge is considerably less than the distance from this spindle to the lower edge, in order that the weight of the grain may exert a greater turning movement on the diverging portions of the plates forming the valve below the spindle, as the valve swings counter-clockwise past the bent strips 23. The grain which continues to come from the chute 1 now begins to pass into the right-hand half of the casing; but the discharge opening 19 is closed up by the curved lower extremities of the valve before any of the grain passing into the right-hand half of the interior of the casing can pass through, and no more grain can pass into the left-hand half because this half is now filled. The further movement of the valve in a counter-clockwise direction will open the outlet 19 and allow a quantity of grain in the left-hand half of the casing to pass out while the operation of filling the right-hand half continues. When the valve 16 is against either stop 21, the edge of one outwardly-bent end 16' projects about one-fourth of the distance across the outlet 19.

The sides of the opening 19 must be so designed that grain will be delivered therethrough, after it is once opened to release the contents of a full half of the interior of the casing, more rapidly than the grain passes into the other half. This will cause one half of the casing to be emptied quicker than the other half is loaded. As a result, before the right-hand half of the casing is fully loaded, the weight 25 will once more lift the casing to bring the rollers 17 into engagement with the notch on the opposite plate 23; and as soon as the right-hand half of the casing is filled in its turn, the casing 2 again overcomes the weight 25 and sinks, and the above operations are repeated.

Every time the valve 17 moves to the right or left it operates the link 26 and registers the movement in the indicator 27. The capacity of the amount of space forming each of the halves of the interior of the casing 2, being known in terms of weight or bulk, it will only be necessary to take a reading from the indicator 27 when the work is finished, to enable the attendant to calculate the number of pounds or the number of bushels which have been measured.

Having thus described my invention, I claim as new and desire to secure by Letters Patent:

1. An automatic grain weigher comprising a receiving casing having an open inlet and an outlet, a movable member mounted in said casing in position to control said outlet by the movements thereof without closing the inlet of said casing, said means being operated by the weight of the grain passing into said casing, and means for permitting the adjustment of said movable member.

2. An automatic grain weigher comprising a pivotally-mounted weighing lever supporting a casing at one end and having means for counterbalancing said casing, said casing having inlet and outlet openings, a valve or damper pivotally mounted in said casing between the inlet and outlet openings, said valve serving to put the space on one side thereof into communication with the inlet opening, and the space on the other side thereof at the same time into communication with the outlet opening, retaining means for holding the valve in said position, an arm connected to the valve and engaging said means and coöperating with the same to hold the valve against movement when the valve is in such position, the weight of the grain when the space on one side of the valve is filled acting to depress the casing and release the arm connected to the valve from the action of said means, the weight of the grain in said space then serving to move the valve to uncover the discharge opening and release the grain therein, and at the same time put the space on the other side of the valve into communication with the inlet to enable the space on each side of the valve to be filled and discharged in turn, and means for permitting the adjustment of said valve relative to said casing.

3. An automatic grain weigher comprising a casing having an open inlet and an outlet, a movable member to control said outlet by the movements thereof without closing the inlet of said casing, a pair of plates in which said member is mounted, and means for adjustably connecting said plates to the sides of said casing.

4. In an automatic grain weigher comprising a casing having an inlet and an outlet, a movable member mounted in said casing in position to control the outlet thereof without closing the inlet of said casing, and a spindle on which said member is mounted, said spindle having lateral arms projecting therefrom to engage said member.

5. In an automatic grain weigher comprising a receiving casing having an open inlet and an outlet, a movable member mounted in said casing in position to control said outlet by the movements thereof without closing the inlet of said casing, said member comprising a pair of plates secured to each other having portions spaced apart, and a spindle on which said plate is mounted, said spindle being located between said spaced-apart portions and having lateral projections engaging said member.

6. An automatic grain weigher comprising a receiving casing having an open inlet and an outlet, a movable member mounted in said casing in position to control said outlet by the movements thereof without closing the inlet of said casing, deflector means mounted in said casing adjacent the inlet thereof, and stops mounted in said casing on either side of the outlet thereof, to limit the movements of the member.

7. In an automatic grain weigher comprising a casing having an open inlet and an outlet, a movable member for controlling said outlet by the movements thereof without closing the inlet of said casing, said member comprising a pair of plates secured to each other and having their upper portions in contact and their lower portions spaced apart, the said lower portions being bent away from each other along their lower edges.

8. In an automatic grain weigher comprising a receiving casing having an open inlet and an outlet, a movable member mounted in said casing and extending through the same from the inlet to the outlet thereof, said member controlling the said outlet by the movements thereof without closing the inlet of said casing, an arm connected to said member, and catches mounted adjacent to said casing for engaging said arm to hold said member at one or the other end of its movements.

In testimony whereof I have signed my name to this specification in the presence of two subscribing witnesses.

EDWIN LENARD ADAMS.

Witnesses:
 DANIEL F. ORGAN,
 WILLIAM U. HATTAN.

---

Copies of this patent may be obtained for five cents each, by addressing the "Commissioner of Patents, Washington, D. C."